United States Patent
Murschall et al.

(12) 
(10) Patent No.: US 6,869,991 B2
(45) Date of Patent: Mar. 22, 2005

(54) WHITE UV-STABILIZED THERMOFORMABLE FILM MADE FROM A CRYSTALLIZABLE THERMOPLAST, METHOD FOR PRODUCING THE SAME AND ITS USE

(75) Inventors: Ursula Murschall, Nierstein (DE); Klaus Oberlaender, Wiesbaden (DE); Guenther Crass, Taunusstein (DE); Ulrich Kern, Ingelheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 212 days.

(21) Appl. No.: 10/181,751

(22) PCT Filed: Jan. 11, 2001

(86) PCT No.: PCT/EP01/00275
§ 371 (c)(1),
(2), (4) Date: Jul. 19, 2002

(87) PCT Pub. No.: WO01/53405
PCT Pub. Date: Jul. 26, 2001

(65) Prior Publication Data
US 2003/0113568 A1 Jun. 19, 2003

(30) Foreign Application Priority Data
Jan. 20, 2000 (DE) .......................................... 100 02 164

(51) Int. Cl.$^7$ .............................. C08K 5/34; C08K 3/10; C08K 3/30
(52) U.S. Cl. .......................... 524/91; 524/100; 524/413; 524/423; 524/425; 524/447; 524/492; 428/411.1; 428/480

(58) Field of Search .......................... 524/91, 100, 413, 524/423, 425, 447, 492, 10; 428/411.1, 480

(56) References Cited

U.S. PATENT DOCUMENTS

| | | | | |
|---|---|---|---|---|
| 4,965,302 A | * | 10/1990 | Hirahara et al. | ............... 524/83 |
| H001975 H | * | 7/2001 | Rosendale et al. | .......... 523/171 |

FOREIGN PATENT DOCUMENTS

| | | |
|---|---|---|
| EP | 0 044 515 A1 | 1/1982 |
| EP | 0 078 633 A1 | 5/1983 |
| EP | 0 292 120 A2 | 11/1988 |
| EP | 0 620 245 A1 | 10/1994 |
| EP | 0 942 031 A1 | 9/1999 |
| EP | 1 052 269 A1 | 5/2000 |

OTHER PUBLICATIONS

H. Day, D. M. Wiles Journal Applied Polymer Science vol. 16, pp. 203–215, (1972.

* cited by examiner

*Primary Examiner*—Kriellion A. Sanders
(74) *Attorney, Agent, or Firm*—ProPat, L.L.C.

(57) ABSTRACT

The invention relates to a white film with a thickness in the range of 1 to 500 μm that contains a crystallizable thermoplast as the main component. The inventive film is further characterized in that it contains at least one UV stabilizer as the light stabilizer and at least one white pigment. The invention further relates to a method for producing said film and the use thereof.

29 Claims, No Drawings

WHITE UV-STABILIZED THERMOFORMABLE FILM MADE FROM A CRYSTALLIZABLE THERMOPLAST, METHOD FOR PRODUCING THE SAME AND ITS USE

White, UV-resistant, thermoformable film made from a crystallizable thermoplastic, its use, and process for its production.

The invention relates to a white, UV-resistant, thermoformable film made from a crystallizable thermoplastic, the thickness of the film being in the range from 10 to 500 µm. The film comprises at least one pigment and one UV stabilizer as light stabilizer, and has good orientability, very good optical and mechanical properties, and good thermoformability. The invention further relates to the use of the film and to a process for its production.

White films with a thickness of from 10 to 500 µm are well known.

These films do not comprise UV stabilizers of any type as light stabilizers, and therefore neither the films nor the items produced from them are suitable for outdoor applications. Even after a short period in outdoor applications, these films exhibit yellowing and impairment of mechanical properties due to photooxidative degradation by sunlight.

These oriented films are moreover not thermoformable.

EP-A-0 620 245 describes films with improved heat resistance. These films comprise antioxidants suitable for scavenging free radicals and for degrading any peroxide formed in the film. However, that specification makes no proposal as to how the UV resistance of films of this type may be improved.

It was an object of the present invention to provide a white film with a thickness of from 10 to 500 µm which has not only good orientability, good mechanical and optical properties, and a low Yellowness Index, but also in particular high UV resistance and high lightfastness, and also good thermoformability.

High UV resistance means that the films are not damaged, or are damaged only to an extremely small extent, by sunlight or other UV radiation, so that the films are suitable for outdoor applications and/or critical indoor applications. In particular, after a number of years of outdoor use the films should not yellow or show embrittlement or surface-cracking, nor show any impairment of mechanical properties.

Examples of the good optical properties are uniform, streak-free coloration, low light transmission (<70%), acceptable surface gloss (>15), and also Yellowness Index virtually unchanged from that of the unstabilized film.

Examples of the good mechanical properties are high modulus of elasticity ($E_{MD}$>3200 N/mm$^2$, $E_{TD}$>3500 N/mm$^2$), and also good values for tensile stress at break (in MD>100 N/mm$^2$, in TD>130 N/mm$^2$).

Good orientability includes an excellent capability of the film for longitudinal and transverse orientation during its production, without break-offs.

Adequate thermoformability means that the film can be thermoformed on commercially available thermoforming machinery to give complex and large-surface-area moldings, without uneconomic predrying.

The film of the invention should moreover be recyclable, in particular without loss of optical and mechanical properties, and also, where appropriate, flame-retardant, so that it can also be used for indoor applications and in the construction of exhibition stands, for example.

This object is achieved by means of a white film with a thickness in the range from 10 to 500 µm, in which the principal constituent present is a crystallizable thermoplastic, wherein the film comprises at least one white pigment and at least one UV stabilizer as light stabilizer, where the UV stabilizer and/or the white pigment are fed directly as a masterbatch during the production of the film, and the film is thermoformable.

The principal constituent present in the white film is a crystallizable thermoplastic. Examples of suitable crystallizable or semicrystalline thermoplastics are polyethylene terephthalate, polybutylene terephthalate, polyethylene naphthalate, preferably polyethylene terephthalate.

According to the invention, crystallizable thermoplastics are crystallizable homopolymers, crystallizable copolymers, crystallizable compounded materials (mixtures), crystallizable recycled material, and other types of crystallizable thermoplastics.

The white film may be either a single-layer or multilayer film. The white film may also have a coating of various copolyesters or adhesion promoters.

The white thermoformable film comprises at least one UV stabilizer as light stabilizer, fed by way of what is known as masterbatch technology directly during production of the film, the concentration of the UV stabilizer being from 0.01 to 8% by weight, preferably from 0.05 to 5% by weight, based on the weight of the layer of the crystallizable thermoplastic.

The white thermoformable film comprises at least one pigment for white coloration, the concentration of the pigment being from 0.3 to 25% by weight, preferably from 1.0 to 20% by weight, based on the weight of the layer of the crystallizable thermoplastic. The white pigment is preferably fed by way of what is known as masterbatch technology directly during production of the film, but may also be incorporated at the premises of the polymer producer.

Preferred suitable white pigments are titanium dioxide, barium sulfate, calcium carbonate, kaolin, silicon dioxide, preferably titanium dioxide or barium sulfate.

The titanium dioxide particles may be composed of anatase or rutile, preferably predominantly of rutile, which has higher opacifying power than anatase. In a preferred embodiment, the titanium dioxide particles are composed of at least 95% by weight of rutile. They may be produced by a conventional process, e.g. by the chloride process or sulfate process. The amount of these in the base layer is from 0.3 to 25% by weight, based on the base layer, and the average particle size is relatively small, preferably in the range from 0.10 to 0.30 µm.

Titanium dioxide of the type described does not produce any vacuoles within the polymer matrix during the production of the film.

The titanium dioxide particles may have a covering of the type usually used as a covering for TiO$_2$ white pigment in papers or paints to improve lightfastness, composed of inorganic oxides.

TiO$_2$ is known to be photoactive. On exposure to UV radiation, free radicals form on the surface of the particles. These free radicals can migrate into the film-forming polymers, causing degradation reactions and yellowing. In order to avoid this, the particles are coated with oxidic materials. Particularly suitable oxides include the oxides of aluminum, silicon, zinc, and of magnesium, and mixtures of two or more of these compounds. Examples of TiO$_2$ particles with a covering of a number of these compounds are described in EP-A-0 044 515 and EP-A-0 078 633. The covering may also comprise organic compounds having polar and nonpolar groups. The organic compounds have to be sufficiently thermally stable during production of the film by extrusion of the polymer melt. Examples of polar groups are —OH; —OR; —COOX; (X=R, H or Na; R=alkyl having from 1 to 34 C atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The covering of the titanium dioxide particles is usually composed of from 1 to 12 g, in particular from 2 to 6 g, of inorganic oxides, and from 0.5 to 3 g, in particular from 0.7 to 1.5 g, of organic compound, based on 100 g of titanium dioxide particles. The covering is applied to the particles in aqueous suspension. The inorganic oxides are precipitated from water-soluble compounds, e.g. alkali metal nitrate, in particular sodium nitrate, sodium silicate (water glass), or silica in the aqueous suspension.

The inorganic oxides, such as $Al_2O_3$ or $SiO_2$, also include the hydroxides and their various dehydration states, e.g. oxide hydrate, the precise composition and structure of these often being unknown. The oxide hydrates, e.g. of aluminum and/or of silicon, are precipitated onto the calcined and ground $TiO_2$ pigment, in aqueous suspension, and the pigments are then washed and dried. This precipitation may therefore take place directly in a suspension such as that produced within the production process after calcination followed by wet-grinding. The oxides and/or oxide hydrates of the respective metals are precipitated from the water-soluble metal salts within the known pH range: for example, for aluminum use is made of aluminum sulfate in aqueous solution (pH below 4), and the oxide hydrate is precipitated within the pH range from 5 to 9, preferably from 7 to 8.5, by adding aqueous ammonia solution or sodium hydroxide solution. If the starting material is waterglass solution or alkali metal aluminate solution, the pH of the initial charge of $TiO_2$ suspension should be within the strongly alkaline range (pH above 8). The precipitation then takes place within the pH range from 5 to 8, by adding mineral acid, such as sulfuric acid. Once the metal oxides have been precipitated, the stirring of the suspension is continued for from 15 min to about 2 h, aging the precipitated layers. The coated pigment is separated off from the aqueous dispersion, washed, and dried at an elevated temperature, particularly from 70 to 100° C.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts below 360 nm, increases markedly below 320 nm, and is very pronounced at below 300 nm. Maximum absorption occurs at between 280 and 300 nm.

In the presence of oxygen it is mainly chain cleavage which occurs, there being no crosslinking. The predominant photooxidation products in quantity terms are carbon monoxide, carbon dioxide, and carboxylic acids. Besides direct photolysis of the ester groups, consideration has to be given to oxidation reactions which likewise form carbon dioxide, via peroxide radicals.

In the photooxidation of polyethylene terephthalate there can also be cleavage of hydrogen at the position α to the ester groups, giving hydroperoxides and decomposition products of these, and this may be accompanied by chain cleavage (H. Day, D. M. Wiles: J. Appl. Polym. Sci. 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. For transparent, matt films the only compounds suitable are those organic or organometallic compounds which produce no, or only extremely slight, color or color change in the thermoplastic to be stabilized, that is to say those which are soluble in the thermoplastic.

For the purposes of the present invention, suitable UV stabilizers used as light stabilizers are UV stabilizers which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., i.e. do not decompose and do not cause release of gases. Examples of suitable UV stabilizers used as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines, and triazines, preference being given to the 2-hydroxybenzotriazoles and the triazines.

In one particularly preferred embodiment, the film of the invention comprises from 0.01 to 5.0% by weight of 2-(4, 6-diphenyl-1,3,5-triazin-2-yl)-5-(hexyl)oxyphenol of the formula

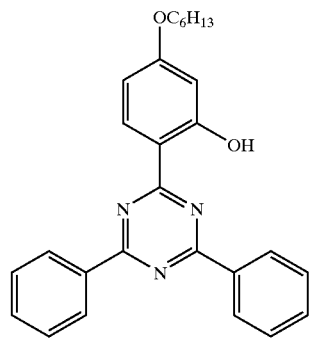

or from 0.01 to 5.0% by weight of 2,2-methylenebis(6-2H-benzotriazol-2-yl)-4-(1,1,2,2-tetramethylpropyl)phenol of the formula

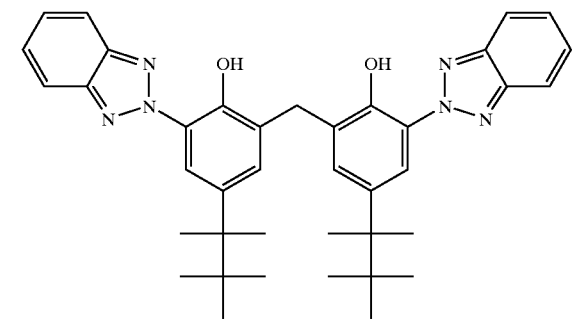

In one preferred embodiment it is also possible to use a mixture of these two UV stabilizers, or a mixture of at least one of these two UV stabilizes with other UV stabilizers, the total concentration of light stabilizer preferably being from 0.01 to 5.0% by weight, based on the weight of crystallizable polyethylene terephthalate.

The UV stabilizer(s) are preferably present in the outer layer(s). If required, a UV stabilizer may also be present in the core layer.

It was entirely surprising that the use of the abovementioned UV stabilizers in films led to the desired result. The skilled worker would probably have initially attempted to achieve some UV resistance via an antioxidant, but would have found that the film rapidly yellows on weathering.

In the light of the fact that UV stabilizers absorb UV light and therefore provide protection, the skilled worker would have been likely to use commercially available stabilizers. He would then have found that the UV stabilizer has insufficient thermal stability and at temperatures of from 200 to 240° C. decomposes and gives rise to release of gases;

he would have had to incorporate large amounts (from about 10 to 15% by weight) of UV stabilizer in order to absorb the UV light and prevent damage to the film.

At these high concentrations he would have found that the film is yellow just after it has been produced, with Yellowness Indices around 25. It would also have been found that mechanical properties are adversely affected. Orientation would have given rise to exceptional problems, such as break-offs due to inadequate strength, i.e. excessively low modulus of elasticity;

die deposits, causing variations in profile;

roller deposits from the UV stabilizer, causing impairment of optical properties (adhesion defects, non-uniform surface);

deposits within stretching frames and setting frames, dropping onto the film.

It was therefore more than surprising that even low concentrations of the UV stabilizer achieved excellent UV protection. It was very surprising that, together with this excellent UV protection within the bounds of accuracy of measurement, the Yellowness Index of the film is unchanged from that of an unstabilized film.

neither any release of gases nor any die deposits, nor any frame condensation occurred, and the film therefore had superior optical properties, excellent profile, and exceptional layflat;

the UV-resistant film has excellent stretchability, permitting its reliable and stable production on high-speed film lines at speeds of up to 420 m/min.

In one preferred embodiment, the film of the invention comprises, as principal constituent, a crystallizable polyethylene terephthalate and from 0.01 to 5.0% by weight of 2-(4,6-diphenyl-1,3,5-triazin-2-yl)-5-(hexyl)oxyphenol or from 0.01 to 5.0% by weight of 2,2'-methylenebis(6-(2H-benzotriazol-2-yl)-4-(1,1,2,2-tetramethylpropyl)phenol as UV stabilizer, and also from 0.3 to 25% by weight of titanium dioxide with a preferred particle diameter of from 0.10 to 0.50 μm as white pigment, a titanium dioxide or rutile type being preferred. Instead of titanium dioxide, it is also possible to use barium sulfate with a particle diameter of from 0.20 to 1.20 μm as white pigment, the concentration being from 1.0 to 25% by weight. In another preferred embodiment, it is also possible to use a mixture of these white pigments or a mixture of one of these white pigments with another white pigment. In another preferred embodiment, it is also possible to use a mixture of the two abovementioned UV stabilizers or a mixture of at least one of these two UV stabilizers with other UV stabilizers, the total concentration of light stabilizer preferably being from 0.01 to 5.0% by weight, based on the weight of the layer of the crystallizable polyethylene terephthalate.

The white, UV-resistant, thermoformable film has the following property profile:

Surface gloss, measured to DIN 67530 (measurement angle 20°) is greater than 15, preferably greater than 20.

Light transmission (transparency) measured to ASTM-D 1003, is less than 80%, preferably less than 70%. The coloration is uniform and streak-free across the running length and the film width.

Longitudinal modulus of elasticity (ISO 527-1-2) is greater than 3 200 N/mm$^2$, preferably greater than 3 600 N/mm$^2$. Transverse modulus of elasticity (ISO 527-1-2) is greater than 3 500 N/mm$^2$, preferably greater than 3 800 N.mm$^2$.

Preferred polymers for producing the film of the invention are polyethylene terephthalates with a crystallite melting point $T_m$, measured by DSC (Differential Scanning Calorimetry) with a heating rate of 10° C./min, of from 220 to 280° C., preferably from 250 to 270° C., with a crystallization temperature range $T_c$ of from 75 to 280° C., preferably from 75 to 260° C., and with a glass transition temperature $T_g$ of from 65 to 90° C., and with a density, measured to DIN 53479, of from 1.30 to 1.45 g/cm$^3$, and with a crystallinity of from 5 to 65%, preferably from 25 to 65%.

It is important for the invention that the crystallizable thermoplastic has a diethylene glycol content of ≧1.0% by weight, preferably ≧1.2% by weight, in particular ≧1.3% by weight, and/or a polyethylene glycol content of ≧1.0% by weight, preferably ≧1.2% by weight, in particular ≧1.3% by weight, and/or an isophthalic acid content of from 3 to 10% by weight.

The DEG content and/or PEG content and/or IPA content of the thermoplastic are established at the premises of the polymer producer during the polymerization process.

Bulk density, measured to DIN 53466, is preferably from 0.75 to 1.0 kg/dm$^3$, particularly preferably from 0.80 to 0.90 kg/dm$^3$.

Polydispersity $M_w/M_n$ of the polyethylene terephthalate, measured by gel permeation chromatography, is preferably from 1.5 to 6.0, and particularly preferably from 2.0 to 3.5.

The white polyethylene terephthalate film which comprises at least one white pigment and one UV stabilizer may be a single-layer film or else a multilayer film.

In the multilayer embodiment, the film has a structure of at least one core layer and at least one outer layer, particular preference being given to a three-layer A-B-A or A-B-C structure.

For this embodiment it is important that the standard viscosity of the polyethylene terephthalate of the core layer is similar to that of the polyethylene terephthalate of the outer layer(s) adjacent to the core layer.

In one particular embodiment, the outer layers may also be composed of a polyethylene naphthalate homopolymer or of a polyethylene terephthalate-polyethylene naphthalate copolymer, or of a compounded material.

In this embodiment, the standard viscosity, of the thermoplastics of the outer layers is again similar to that of the polyethylene terephthalate of the core layer.

In the multilayer embodiment, the white pigment is preferably present in the core layer. If required, the outer layers may also have white pigment.

In the multilayer embodiment, the UV stabilizer is preferably present in the outer layer(s). However, if required there may also be UV stabilizers present in the core layer.

Unlike in the single-layer embodiment, the concentration of the stabilizer(s) in the multilayer film is based on the weight of the thermoplastics in the layer in which UV stabilizer(s) is/are present.

It is highly surprising that weathering tests to the ISO 4892 specification using the Atlas CI65 Weather Ometer have shown that in order to achieve improved UV resistance in the case of a three-layer film it is fully sufficient for UV stabilizers to be present in the outer layers of thickness from 0.5 to 2 μm.

This means that the UV-resistant multilayer films, which are produced by known coextrusion technology, are of great economic interest when compared with monofilms provided with UV stabilization throughout, since markedly less UV stabilizer is needed for comparable UV resistance.

At least one side of the film may also have been provided with a scratch-resistant coating, with a copolyester, or with an adhesion promoter.

The results from weathering tests is that even after from 5 to 7 years (extrapolated from the weathering tests) of outdoor application the UV-resistant films of the invention generally have no increased yellowing, no embrittlement, no loss of surface gloss, no surface cracking, and no impairment of mechanical properties.

During production of the films it was found that the UV-resistant films have excellent capability for longitudinal and transverse orientation, without break-offs. Furthermore, no release of gases of any type brought about by the UV stabilizer were found during the production process, and this is important for the invention, since most conventional UV stabilizers are the cause of undesirable and unpleasant release of gases at extrusion temperatures above 260° C., and cannot therefore be used.

In addition, the film or the molding can be recycled without difficulty, without pollution of the environment, and without any noticeable impairment of optical and mechanical properties, and is therefore suitable for use as short-lived advertising placards, for example, or in the construction of exhibition stands, or for other promotional items, where flame retardancy and thermoformability is desired.

In addition, the film can be thermoformed without predrying, and can therefore be used to produce complex moldings with excellent reproduction of detail.

The thermoforming process generally encompasses the steps of predrying, heating, molding, cooling, demolding, and heat-conditioning. Surprisingly, during the thermoforming process it was found that the films of the invention can be thermoformed without prior predrying. This advantage over thermoformable polycarbonate films or thermoformable polymethacrylate films, which require predrying times of from 10 to 15 hours, depending on thickness, at temperatures of from 100 to 120° C., drastically reduces the costs of the forming process. It is also very surprising that the reproduction of detail on the molding is excellent.

The following process parameters have generally proven suitable for the thermoforming process:

| Step of process | Film of invention |
|---|---|
| Predrying | not required |
| Temperature of mold ° C. | from 100 to 140 |
| Heating time per 10 μm of film thickness | <5 sec per 10 μm of film thickness |
| Film temperature during thermoforming ° C. | from 100 to 160 |
| Orientation factor possible | from 1.5 to 4.0 |
| Reproduction of detail | excellent |
| Shrinkage % | <1.5 |

In addition, the film of the invention can be recycled without difficulty, without pollution of the environment, and without loss of mechanical properties, making it suitable for use as short-lived advertising placards, for example, or other promotional items.

An example of a method for producing the white, UV-resistant, thermoformable film of the invention is an extrusion process on an extrusion line.

Here, a crystallizable thermoplastic is melted in at least one extruder, and the resultant polymer melt corresponding to the composition of the film layer is fed to a die, or the resultant polymer melts corresponding to the compositions of the outer and base layers are fed to a coextrusion die, and extruded from the die onto a chill roll, and the resultant prefilm is then biaxially oriented and heat-set.

According to the invention, the white pigment and the UV stabilizer may be introduced before the material leaves the producer of the thermoplastic polymer, or fed into the extruder during production of the film.

It is particularly preferable to add the UV stabilizer and the white pigment by way of masterbatch technology. The light stabilizer and, respectively, the white pigment is fully dispersed in a solid carrier material. Carrier materials which may be used are the thermoplastic itself, e.g. the polyethylene terephthalate, or else other polymers sufficiently compatible (e.g. PEN, PBT) with the thermoplastic.

In masterbatch technology it is important that the grain size and the bulk density of the masterbatch are similar to the grain size and the bulk density of the thermoplastic, so that uniform distribution is achieved, and with this uniform UV resistance and uniform whiteness.

Any drying needed of the masterbatch(es) or of the polyethylene terephthalate prior to extrusion preferably takes place from 0.5 to 2 hours at from 160 to 180° C.

In the preferred extrusion process for producing the polyester film, the molten polyester material is extruded through a slot die and quenched on a chill roll in the form of a substantially amorphous prefilm. This film is then reheated and stretched longitudinally and transversely, or transversely and longitudinally, or longitudinally, transversely, and again and longitudinally and/or transversely. The stretching temperatures are generally from $T_G+10°$ C. to $T_G+60°$ C. ($T_G$=glass transition temperature), and the stretching ratio for longitudinal stretching is usually from 2 to 6, in particular from 3 to 4.5, and that for transverse stretching is from 2 to 5, in particular from 3 to 4.5, and that for any second longitudinal or transverse stretching carried out is from 1.1 to 5. Where appropriate, the first longitudinal stretching may be carried out simultaneously with the transverse stretching (simultaneous stretching). Heat-setting of the film follows at oven temperatures of from 180 to 260° C., in particular from 220 to 250° C. The film is then cooled and wound.

The surprising combination of exceptional properties gives the white film of the invention excellent suitability for a wide variety of uses, for example for interior decoration, for the construction of exhibition stands or exhibition requisites, for displays, for placards, for labels, for protective glazing of machinery or of vehicles, in the lighting sector, in the fitting out of shops or of stores, or as a promotional item or laminating medium, or food applications.

The good UV resistance of the white film of the invention also makes it suitable for outdoor applications, e.g. for roofing systems, exterior cladding, protective coverings, applications in the construction sector, illuminated advertising profiles, and in the transport sector. Thermoformability makes the film of the invention suitable for the thermoforming of any desired moldings for indoor or outdoor applications.

The invention is further illustrated below using examples, but is not restricted thereby.

The following standards or methods are used here for the measurement of individual properties.

Test Methods
DEG Content, PEG Content, and IPA Content
  DEG content, PEG content, and IPA content is determined by gas chromatography after saponification in methanolic KOH and neutralization with aqueous HCl.
Surface Gloss
  Surface gloss is measured at a measurement angle of 20° to DIN 67530.
Light Transmission
  Light transmission is the ratio of total transmitted light to the amount of incident light.
  Light transmission is measured using the "®HAZE-GARD plus" tester ASTM D 1003.
Surface Defects, Uniform Coloration
  Surface defects, e.g. cracks, embrittlement, specks, orange-peel, blisters, etc., and uniform coloration are determined visually.
Mechanical Properties
  Modulus of elasticity, tensile stress at break, and tensile strain at break are measured longitudinally and transversely to ISO 527-1-2.
Density
  Density is determined to DIN 53479.
SV (DCA), IV (DCA)
  Standard viscosity SV (DCA) is measured by a method based on DIN 53726 in dichloroacetic acid.
  Intrinsic viscosity (IV) is calculated as follows from standard viscosity (SV)

$$IV(DCA) = 6.67 \cdot 10^{-4} SV(DCA) + 0.118$$

Thermal Properties
  Thermal properties, such as crystallite melting point $T_m$, crystallization temperature range $T_c$, post-(cold-)crystallization temperature $T_{CN}$, and glass transition temperature $T_g$, are determined by differential scanning calorimetry (DSC) with a heating rate of 10° C./min.
Molecular Weight, Polydispersity
  Molecular weight $M_w$ and $M_n$ and the resultant polydispersity $M_w/M_n$ are measured by gel permeations, chromatography (GPC).
Weathering (Bilateral), UV Resistance
  UV resistance is tested as follows to test specification ISO 4892

| Test equipment | Atlas Ci 65 Weather Ometer |
|---|---|
| Test conditions | ISO 4892, i.e. artificial weathering |
| Irradiation time | 1 000 hours (per side) |
| Irradiation | 0.5 W/m², 340 nm |
| Temperature | 63° C. |
| Relative humidity | 50% |
| Xenon lamp | internal and external filter made from borosilicate |
| Irradiation cycles | 102 minutes of UV light then 18 minutes of UV light with water spray on the specimens, then again 102 minutes of UV light, etc. |

Yellowness Index
  Yellowness Index (YI) is the deviation from the colorless condition in the "yellow" direction and is measured to DIN 6167. Yellowness Index values (YI)<5 are not visible.
  Each of the examples and comparative examples below uses white films of varying thickness and having one or more layers, the films being produced on the extrusion line described.

Each of the films was weathered to test specification ISO 4892 for 1 000 hours per side using the Atlas Ci 65 Weather Ometer from the company Atlas, and then tested for mechanical properties, Yellowness Index, surface defects, light transmission, and gloss.

EXAMPLE 1

A white film of 50 µm thickness is produced and comprises, as principal constituent, polyethylene terephthalate, 7.0% by weight of titanium dioxide and 1.0% by weight of the UV stabilizer 2-(4,6-diphenyl-1,3,5-triazin-2-yl)-5-(hexyl)oxyphenol (®Tinuvin 1577 from the company Ciba-Geigy).

The titanium dioxide is of rutile type and has an average particle diameter of 0.20 µm, and has a coating of $Al_2O_3$.

®Tinuvin 1577 has a melting point of 149° C. and is thermally stable up to about 330° C.

For purposes of uniform distribution, 7.0% by weight of titanium dioxide and 1.0% by weight of the UV stabilizer are incorporated into the polyethylene terephthalate directly at the premises of the polymer producer.

The polyethylene terephthalate from which the white film is produced has standard viscosity of SV (DCA) of 810, corresponding to intrinsic viscosity IV (DCA) of 0.658 dl/g. The moisture content is 0.2% by weight, and the density (DIN 53479) is 1.41 g/cm³. Crystallinity is 59%, the crystallite melting points from DSC measurements being 258° C. The crystallization temperature range $T_c$ is from 83 to 258° C., the post-crystallization temperature (or cold crystallization temperature) $T_{CN}$ being 144° C. The polydispersity $M_w/M_n$ of the polyethylene terephthalate is 2.14. The glass transition temperature is 83° C. The DEG content, established at the premises of the polymer producer, is 1.6% by weight.

The individual steps of the process were:

| Longitudinal stretching temperature | 85–135° C. |
|---|---|
| Longitudinal stretching ratio | 4.01:1 |
| Transverse stretching temperature | 85–135° C. |
| Transverse stretching ratio | 4.01:1 |
| Setting temperature | 230° C. |

The white PET film produced has the following property profile:

| Thickness | 50 µm |
|---|---|
| Surface gloss side 1 | 72 |
| (Measurement angle 20°) side 2 | 68 |
| Light transmission | 28% |
| Surface defects | none |
| Longitudinal modulus of elasticity | 4 300 N/mm² |
| Transverse modulus of elasticity | 5 600 N/mm² |
| Longitudinal tensile stress at break | 190 N/mm² |
| Transverse tensile stress at break | 280 N/mm² |
| Longitudinal tensile strain at break | 170% |
| Transverse tensile strain at break | 85% |
| Yellowness Index (YI) | 48 |
| Coloration | uniform |

After in each case 1 000 hours of weathering per side with the Atlas Ci65 Weather Ometer the PET film has the following properties:

| | |
|---|---|
| Thickness | 50 μm |
| Surface gloss side 1 | 70 |
| (Measurement angle 20°) side 2 | 66 |
| Light transmission | 27% |
| Surface defects | none |
| Yellowness Index (YI) | 49 |
| Longitudinal modulus of elasticity | 4 150 N/mm² |
| Transverse modulus of elasticity | 5 600 N/mm² |
| Longitudinal tensile stress at break | 170 N/mm² |
| Transverse tensile stress at break | 250 N/mm² |
| Longitudinal tensile strain at break | 150% |
| Transverse tensile strain at break | 70% |
| Coloration | uniform |

EXAMPLE 2

Using a method based on example 1, a white film is produced, the UV stabilizer 2-(4,6-diphenyl-1,3,5-triazin-2-yl)-5-(hexyl)oxyphenol (®Tinuvin 1577) being fed in the form of a masterbatch. The masterbatch is composed of 5% by weight of ®Tinuvin 1577 as active component and 95% by weight of the polyethylene terephthalate of example 1.

Prior to the extrusion process, 90% by weight of the titanium-dioxide-containing polyethylene terephthalate of example 1 are dried with 10% by weight of the masterbatch at 170° C. The methods for extrusion and film production are similar to those of example 1.

The white PET film produced has the following property profile:

| | |
|---|---|
| Thickness | 50 μm |
| Surface gloss side 1 | 74 |
| (Measurement angle 20°) side 2 | 71 |
| Light transmission | 27% |
| Surface defects | none |
| Longitudinal modulus of elasticity | 4 200 N/mm² |
| Transverse modulus of elasticity | 5 650 N/mm² |
| Longitudinal tensile stress at break | 160 N/mm² |
| Transverse tensile stress at break | 250 N/mm² |
| Longitudinal tensile strain at break | 160% |
| Transverse tensile strain at break | 75% |
| Yellowness Index (YI) | 46 |
| Coloration | uniform |

After in each case 1 000 hours of weathering per side with the Atlas Ci65 Weather Ometer the PET film has the following properties:

| | |
|---|---|
| Thickness | 50 μm |
| Surface gloss side 1 | 72 |
| (Measurement angle 20° C.) side 2 | 70 |
| Light transmission | 25% |
| Haze | 4.1% |
| Surface defects | none |
| Yellowness Index (YI) | 47 |
| Longitudinal modulus of elasticity | 4 050 N/mm² |
| Transverse modulus of elasticity | 5 500 N/mm² |
| Longitudinal tensile stress at break | 151 N/mm² |
| Transverse tensile stress at break | 238 N/mm² |
| Longitudinal tensile strain at break | 152% |
| Transverse tensile strain at break | 68% |

EXAMPLE 3

Using a method based on example 2, a white film of 350 μm thickness is produced.

The PET film produced has the following property profile:

| | |
|---|---|
| Thickness | 350 μm |
| Surface gloss side 1 | 70 |
| (Measurement angle 20°) side 2 | 60 |
| Light transmission | 10% |
| Surface defects | none |
| Yellowness Index (YI) | 50 |
| Longitudinal modulus of elasticity | 3 600 N/mm² |
| Transverse modulus of elasticity | 4 200 N/mm² |
| Longitudinal tensile stress at break | 180 N/mm² |
| Transverse tensile stress at break | 200 N/mm² |
| Longitudinal tensile strain at break | 220% |
| Transverse tensile strain at break | 190% |

After in each case 1 000 hours of weathering per side with the Atlas Ci 65 Weather Ometer the PET film has the following properties:

| | |
|---|---|
| Thickness | 350 μm |
| Surface gloss side 1 | 68 |
| (Measurement angle 20°) side 2 | 65 |
| Light transmission | 9% |
| Surface defects | none |
| Yellowness Index (YI) | 52 |
| Longitudinal modulus of elasticity | 3 500 N/mm² |
| Transverse modulus of elasticity | 4 050 N/mm² |
| Longitudinal tensile stress at break | 165 N/mm² |
| Transverse tensile stress at break | 185 N/mm² |
| Longitudinal tensile strain at break | 200% |
| Transverse tensile strain at break | 170% |

EXAMPLE 4

Coextrusion technology is used to produce a multilayer PET film of thickness 50 μm with the layer sequence A-B-A, B being the core layer and A being the outer layers. The thickness of the core layer B is 48 μm and that of each of the two outer layers which cover the core layer is 1 μm.

The titanium-dioxide-containing polyethylene terephthalate used for the core layer B is identical with that of example 2. The polyethylene terephthalate of the outer layers A is identical with the polyethylene terephthalate of example 2, but comprises no titanium dioxide.

Using a method similar to that of example 2, the 5% strength by weight ®Tinuvin 1577 masterbatch is used, but 20% by weight of the masterbatch are fed by way of masterbatch technology only to the outer layers of 1 μm thickness.

The white multilayer PET film produced with UV-resistant outer layers has the following property profile:

| | |
|---|---|
| Layer structure | A-B-A |
| Total thickness | 50 μm |
| Surface gloss side 1 | 124 |
| (Measurement angle 20°) side 2 | 119 |
| Light transmission | 30% |
| Surface defects | none |
| Longitudinal modulus of elasticity | 4 300 N/mm² |
| Transverse modulus of elasticity | 5 720 N/mm² |
| Longitudinal tensile stress at break | 180 N/mm² |
| Transverse tensile stress at break | 265 N/mm² |
| Longitudinal tensile strain at break | 165% |
| Transverse tensile strain at break | 85% |
| Yellowness Index (YI) | 40 |
| Coloration | uniform |

After 1 000 hours of weathering per side with the Atlas CI 65 Weather Ometer the multilayer film has the following properties:

| | |
|---|---|
| Layer structure | A-B-A |
| Total thickness | 50 μm |
| Surface gloss side 1 | 120 |
| (Measurement angle 20°) side 2 | 115 |
| Light transmission | 28% |
| Surface defects | none |
| Longitudinal modulus of elasticity | 4 175 N/mm² |
| Transverse modulus of elasticity | 5 650 N/mm² |
| Longitudinal tensile stress at break | 165 N/mm² |
| Transverse tensile stress at break | 250 N/mm² |
| Longitudinal tensile strain at break | 155% |
| Transverse tensile strain at break | 75% |
| Yellowness Index (YI) | 42 |
| Coloration | uniform |

Thermoformability

The films of examples 1 to 3 can be thermoformed to give moldings on commercially available thermoforming machinery, e.g. from the company Illig, without predrying. The reproduction of detail in the moldings is excellent, with uniform surface.

COMPARATIVE EXAMPLE 1

Using a method based on example 1, a PET monofilm of 50 μm thickness is produced. In contrast to example 1, no UV stabilizer is present in the film. The PET used has DEG content of 0.6% by weight.

The unstabilized white film produced has the following property profile:

| | |
|---|---|
| Thickness | 50 μm |
| Surface gloss side 1 | 70 |
| (Measurement angle 20°) side 2 | 67 |
| Light transmission | 27% |
| Surface defects | none |
| Longitudinal modulus of elasticity | 4 350 N/mm² |
| Transverse modulus of elasticity | 5 800 N/mm² |
| Longitudinal tensile stress at break | 185 N/mm² |
| Transverse tensile stress at break | 270 N/mm² |
| Longitudinal tensile strain at break | 160% |
| Transverse tensile strain at break | 80% |
| Yellowness Index (YI) | 49 |

After 1 000 hours of weathering per side with the Atlas CI 65 Weather Ometer the film exhibits embrittlement phenomena and cracking on the surfaces. The property profile cannot therefore be measured with precision. The film also has a visibly higher level of yellowing.

The film has inadequate thermoformability.

What is claimed is:

1. A white, thermoformable biaxially oriented film in which the principal constituent is a crystallizable thermoplastic, wherein the film comprises at least one white pigment and at least one UV stabilizer as light stabilizer, where the UV stabilizer and the white pigment are expediently fed directly as a masterbatch during the production of the film and the crystallizable thermoplastic has one or more of the following
    a diethylene glycol content of ≧1.0% weight,
    a polyethylene glycol content of ≧1.0% by weight,
    an isophthalic acid content of from 3.0 to 10.0% by weight.

2. The film as claimed in claim 1, wherein the diethylene glycol content is ≧1.2% by weight.

3. The film as claimed in claim 1, wherein the diethylene glycol content is ≧1.3% by weight.

4. The film as claimed in claim 1, wherein the polyethylene glycol content is ≧1.2% by weight.

5. The film as claimed in claim 1, wherein the polyethylene glycol content is ≧1.3% by weight.

6. The film as claimed in claim 1, wherein the concentration of the UV stabilizer is from 0.01 to 5% by weight, based on the weight of the layer of the crystallizable thermoplastic.

7. The fun as claimed in claim 1, wherein the UV stabilizer is selected from the group consisting of 2-hydroxybenzotriazoles and triazines.

8. The film as claimed in claim 7, wherein the UV stabilizer is at least one compound selected from the group consisting of 2-(4,6-diphenyl- 1,3,5-triazin-2-yl)-5-hexyloxyphenol and 2,2'-methylenebis(6-(2H-benzotriazol-2-yl)4-(1,1,2,2-tetramethylpropyl)phenol.

9. The film as claimed in claim 1, wherein the crystallizable thermoplastic has a crystallinity of from 5 to 65%.

10. The film as claimed in claim 1, wherein the crystallizable thermoplastic is selected from the group consisting of polyethylene terephthalate, polybutylene tarephthalate and polyethylene naphthalate.

11. The film as claimed in claim 10, wherein the crystallizable thermoplastic comprises polyethylene terephthalate.

12. The film as claimed in claim 10, wherein recycled material is present in the film.

13. The film as claimed in claim 1, wherein the white pigment is one or more white pigments selected from the group consisting of titanium dioxide, barium sulfate, calcium carbonate, kaolin and silicon dioxide.

14. The film as claimed in claim 13, wherein the white pigment is titanium dioxide.

15. The film as claimed in claim 1, wherein the white pigment is coated.

16. The film am claimed in claim 1, wherein the amount of white pigment, based on the base layer in which the white pigment is present, is from 0.3 to 25% by weight.

17. The film as claimed in claim 1, wherein the average particle size of the white pigment is from 0.10 to 0.30 μm.

18. The film as claimed in claim 1, wherein the surface gloss, measured to DIN 67530 (measurement angle 20°), is above 15.

19. The film as claimed in claim 1, wherein the luminous transmittance, measured to ASTM D 1003, is below 80%.

20. The film as claimed in claim 1, wherein the modulus of elasticity, measured to ISO 527-1-2, is above 3360 N/mm$^2$ longitudinally and above 4800 N/mm$^2$ transversely.

21. The film as claimed in claim 1, wherein the film has a single-layer structure.

22. The film as claimed in claim 1, wherein the film has a structure of more than one layer with at least one outer layer and with at least one core layer.

23. The film as claimed in claim 22, wherein the structure of more than one layer has two outer layers and a core layer lying between the outer layers.

24. The film as claimed in claim 22, wherein at least one white pigment is present in the base layer.

25. The film as claimed in claim 22, wherein at least one UV stabilizer is present in the outer layer or layers.

26. A process for producing a white film as claimed in claim 1, which comprises melting a crystallizable, thermoplastic in at least one extruder and introducing the resultant polymer melt corresponding to the composition of the film layer into a die, or introducing the resultant polymer melts corresponding to the compositions of the outer and base layers into a coextrusion die, and extruding these from the die onto a chill roll, and then biaxially orienting and beat-setting the resultant prefilm, where at least one white pigment is present in the polymer melt(s) for at least one of either the base layer or for the outer layer(s) and at least one UV stabilizer is present in the melt for the outer layer(s).

27. The process as claimed in claim 22, wherein at least one of either the white pigment or UV stabilizer is added by way of masterbatch technology.

28. An article formed film as claimed in claim 1, said article used as interior decoration, as a display, for placards, for protective glazing, in the lighting sector, in the fitting out of shops or of stores, as a promotional requisite or laminating medium, for greenhouses, roofing systems, exterior cladding, protective coverings, in the construction sector, as an illuminated advertising profile or a blind, or in electrical applications.

29. A white, thermoformable film in which the principal constituent is a crystallizable thermoplastic, wherein the film comprises at least one white pigment and at least one UV stabilizer as light stabilizer selected the group consisting of 2-hydroxybenzotriazoles and triazines, where the UV stabilizer and the white pigment are expediently fed directly as a masterbatch during the production of the film and the film exhibits a light transmission of less than or equal to 30, as measured using ASTM-D 1003.

* * * * *